US007978829B2

(12) United States Patent
Mao

(10) Patent No.: US 7,978,829 B2
(45) Date of Patent: Jul. 12, 2011

(54) VOICE FILE RETRIEVAL METHOD

(75) Inventor: Ying-Long Mao, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 1245 days.

(21) Appl. No.: 11/637,784

(22) Filed: Dec. 13, 2006

(65) Prior Publication Data

US 2007/0280440 A1 Dec. 6, 2007

(30) Foreign Application Priority Data

May 30, 2006 (TW) .............................. 95119230 A

(51) Int. Cl.
*H04M 11/00* (2006.01)

(52) U.S. Cl. .................................. 379/88.13; 379/88.22

(58) Field of Classification Search ............... 379/88.13, 379/88.22

See application file for complete search history.

(56) References Cited

U.S. PATENT DOCUMENTS

| | | | | |
|---|---|---|---|---|
| 5,920,559 | A * | 7/1999 | Awaji | 370/392 |
| 6,031,915 | A * | 2/2000 | Okano et al. | 381/56 |
| 6,356,634 | B1 * | 3/2002 | Noble, Jr. | 379/266.07 |
| 6,493,427 | B1 * | 12/2002 | Kobylevsky et al. | 379/67.1 |
| 6,879,957 | B1 * | 4/2005 | Pechter et al. | 704/267 |
| 7,746,847 | B2 * | 6/2010 | Chitturi | 370/352 |
| 7,808,988 | B2 * | 10/2010 | Neff | 370/389 |
| 2006/0199594 | A1 * | 9/2006 | Gundu | 455/452.2 |

* cited by examiner

*Primary Examiner* — Simon Sing
(74) *Attorney, Agent, or Firm* — Birch, Stewart, Kolasch & Birch, LLP

(57) ABSTRACT

A voice file retrieval method comprising the steps of: inputting a word; determining if voicing of the word is needed or not; obtaining a storage home address of a voice file corresponding to the word from a voice field of the word if the voice of the word is needed; and retrieving the voice file from the storage home address. By providing a voice field of the word, the storage home address of the voice file can be directly obtained. Hence, the retrieval speed can be increased, and the time to wait for an articulation of the word can be shortened.

6 Claims, 2 Drawing Sheets

VOICE FILE RETRIEVAL METHOD

BACKGROUND OF THE INVENTION (1) Field of the Invention

The invention relates to a method for retrieving voice files, and more particularly to a retrieval method for directly retrieving the home address of the voice file to speed up the searching process.

(2) Description of the Prior Art

It has been one of the mainstream goals and also one of the must ability for people's career to have a preferable speech ability for electronic dictionaries. Therefore, various electronic dictionaries have been provided to the market to help people achieving the aforesaid goals. In these electronic dictionaries, to have the lexical articulation (voice) is one of the basic elements.

Generally, the electronic dictionary having the lexical articulation function needs to store both the definition of the word and the voice file recording the articulation of the word. When an articulation function of a word has been selected, a search on all the voice files has to be executed so as to retrieve correctly the corresponding voice file for broadcasting.

Traditionally, the amount of the voice files is huge and increasing. Therefore, the storage and search of the voice files in the electronic dictionary has become a severe challenge to this industry.

By taking an electronic Chinese-English bilingual dictionary for example, at least 50,000 voice files are basically needed. Even these voice files are stored by compression coding into respective files of adaptive multi-rate (AMR) format, the storage space would require at least 20,000,000,000,000-bit bytes.

Besides the occupation problem raised by the huge storage space in demand, the speed in retrieving the correct voice file from the mega data bank of the AMR files is usually too slow to be tolerated.

Currently, the function of the simple lexical articulation does merely satisfy the people basic need. The new function in voicing a complete example sentence is become a hot topic to the electronic dictionaries. However, it is much complicated to retrieve the voicing of a complete sentence that is consisted of several words. Generally, plural voice files have to be retrieved so as to compose the articulation of the sentence for voicing a complete sentence. Definitely, the speed in achieving the articulation of a complete sentence is far slower than people expected.

Therefore, how to resolve the storage and retrieval problems in the electronic dictionaries is an important issue that the skilled person in the art is particularly devoted to.

SUMMARY OF THE INVENTION

Accordingly, the present invention provides a voice file retrieval method comprising the steps of:

Inputting a word;

Determining if voicing of the word is needed or not;

If positive, obtaining a storage home address of a voice file corresponding to the word from a voice field of the word; and Retrieving the voice file from the storage home address.

In the present invention, because the storage home address for storing the respective voice file can be obtained directly from the voice field of the word, so the retrieval speed can be substantially increased. That is to say that the idle time for a user to wait for a lexical articulation in the electronic dictionary can be greatly shortened.

All these objects are achieved by the voice file retrieval method described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a voice file retrieval method. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
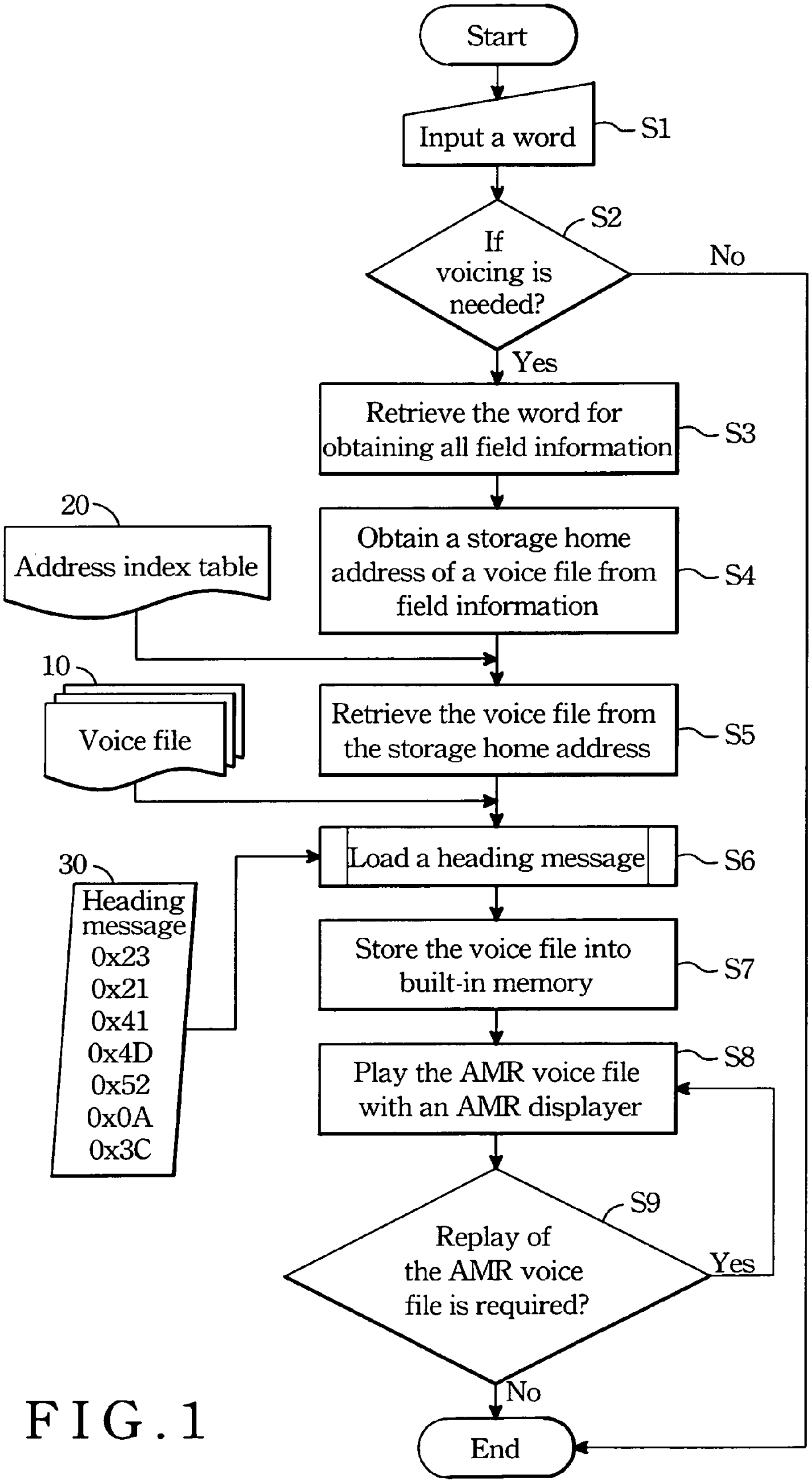
FIG. 1 is a flowchart of a preferred voice file retrieval method in accordance with the present invention.

Referring now to FIG. 1, a flowchart of a preferred embodiment of the voice file retrieval method in accordance with the present invention is shown. The voice file retrieval method comprises the steps as follows.

S1: Input a word.

S2: Determine whether voicing of the word is needed or not. If negative, the method is ended directly. If the voicing of the word is needed, go to step S3.

S3: Retrieve the word as well as its accompanying field information from the electronic dictionary. In this embodiment, the decision whether the articulation of the word is needed is made prior to the retrieval of the word. In another embodiment, the decision whether the articulation of the word is needed can be made posterior to the retrieval of the word.

S4: Obtain a storage home address of a voice file 10 corresponding to the word from the field information of the word.

In the present invention, every word is mapped to its own voice file 10, and every voice file 10 has its storage home address. Every storage home address of the voice file 10 is tagged to the voice field information of the word.

Upon the aforesaid arrangement, after step S3 is performed to retrieve all the field information of the word, the voice field as well as all the information tagged to this voice field can be automatically read. In particular, the message tagged in the voice field information could include the storage home address 101 of the voice field 10. The storage address 101 includes at least an index information, a position information.

Figure 2:
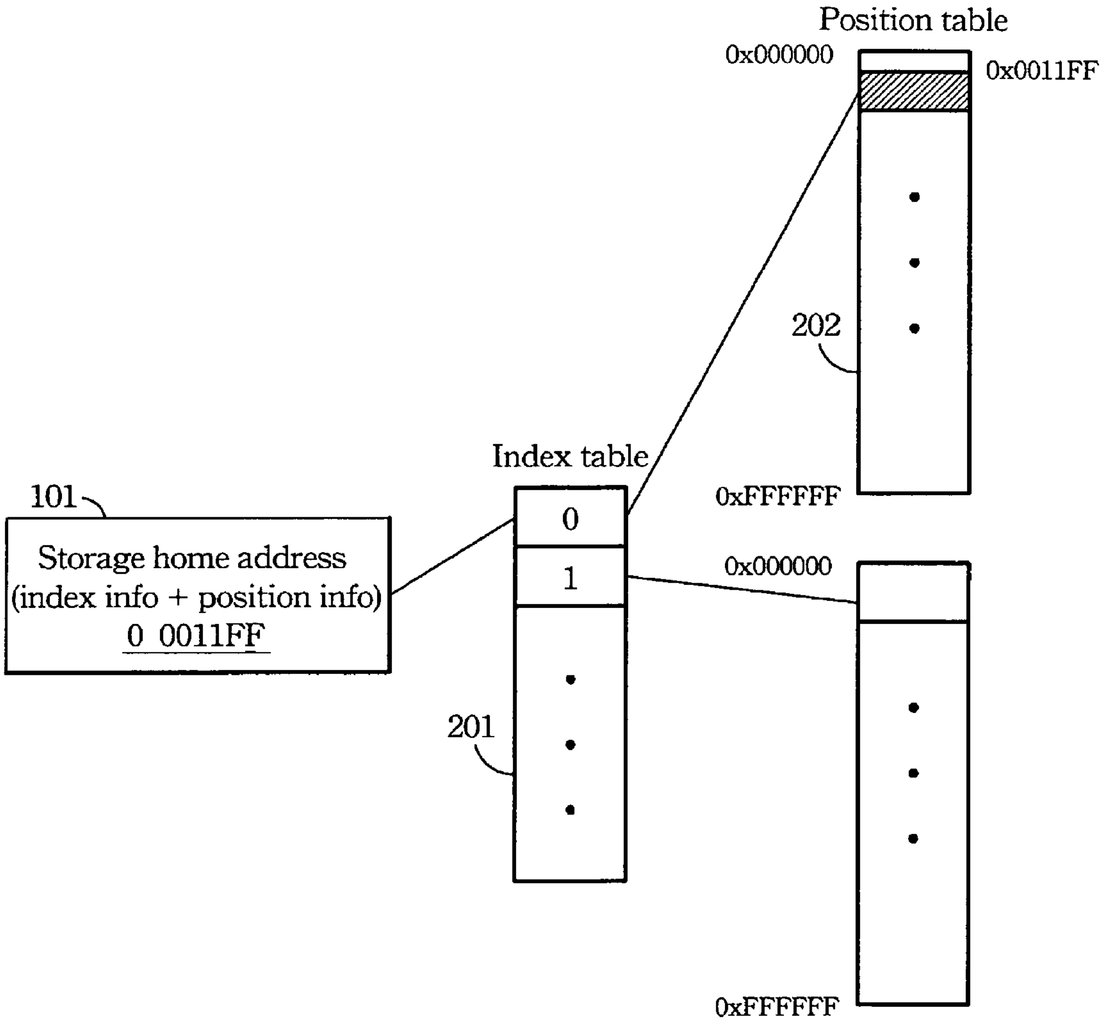
FIG. 2 is a schematic diagram showing how a multiple retrieval in accordance with the present invention is performed.

For example, as shown in FIG. 2, a schematic diagram to show how a multiple retrieval of the present invention is performed is shown. In this embodiment, after the field information of the word is retrieval, the message "0 0011FF" in the voice field is read. Namely, the storage home address 101 of the voice field 10 with respect to the word is "0 0011FF", in which the leading "0" and the following "0011FF" stand for the index information and the position information of the voice file 10, respectively.

S5: Retrieve the voice file 10 in accordance with the storage home address 101. In this step, the retrieval of the voice field 10 is executed in accordance with the aforesaid index and position information and an address index table 20 preset in advance.

As shown in FIG. 2, the index table 201 is established by regrouping the voice files 10 into a plurality of document packets. In accordance with the index table 201, the document packet for a particular voice file 10 can be located. A position table 202 can be established in accordance with the storage addresses of the document packets.

It is noted that the number of the voice files 10 may be different from the number of the document packets. For example, voice files 10 for 50,000 words can be divided into 16 document packets. Namely, every document packet can contain 3,125 voice files 10. The 16 document packets can be numbered to establish an index table 201.

Accordingly, the voice file 10 corresponding to the aforesaid "0 0011FF" storage home address represents that the voice file 10 is stored in the document packet numbered as "0" according to the index table 201.

In the document packet numbered as "0", 0x000000~0xFFFFFF are assigned to the addresses of the voice files in this packet. The position information "0011FF" represents the position 0x0011FF in the position table 202. Namely, the target voice file 10 can be retrieved in accordance with 0x0011FF of the document packet "0".

Upon such an arrangement that the storage home address of the voice file 10 is tagged directly to follow the voice field information of the word, only a few steps are needed to retrieve the home address of the voice file 10, and thereby the retrieval speed can be substantially increased.

S6: A heading message 30 is loaded to the voice file 10 so as to form a corresponding adaptive multi-rate (AMR) voice file.

In the present invention, the voice file 10 can be separated into a heading message region and a voice message region. While performing AMR compression coding, the voice files 10 have the same heading message. For example, if a voice file of pulse code modulation (PCM) experiences the AMR compression coding by an 8K sampling rate and a compression ratio of 4.75 kbit/s, its first 7 bytes would be 0x23, 0x21, 0x41, 0x4D, 0x52, 0x0A and 0x3C.

In one embodiment of the present invention, the voice files 10 under AMR compression coding could have preferably no heading message. That is, all the heading messages of the voice files 10 in the present invention have been removed.

Namely, the voice file 10 of the present invention is formed by removing the heading message after the voice file experiences the AMR compression coding. The heading message could be reloaded to integrate with the voice region while the voice file is played, and an original AMR voice file is accordingly formed.

In the aforesaid example, every voice file 10 can save 7 bytes of the storage space. That is to say that 341.8 K-bit bytes can be saved in the lexicon of 50,000 words.

In another embodiment of the present invention, the heading message can be always with the voice file. Thus, the aforesaid separating process and the foresaid reloading process for the heading message is unnecessary any more.

S7: Load the voice file into the built-in memory. In this step, the original AMR voice file with the heading message is stored into the built-in memory.

S8: Play or broadcast the AMR voice file with an AMR displayer or broadcaster.

S9: After the AMR voice file is played, determine whether or not a replay of the AMR voice file is required. If positive, the AMR player displays the AMR voice file one more time.

In the present invention, a retrieval relationship between the word and its corresponding voice file has been established. By providing this relationship, the storage home address of the voice file can be directly obtained from the voice field of the word. Thereby, the retrieval speed of the voice file can be substantially increased and the idle time for a user to wait for an articulation is greatly shortened.

In the present invention, the storage format of the voice file is an AMR voice file ridding of the heading message during storage step. Therefore, the storage space required to store the voice files can be greatly reduced. Obviously, by providing the present invention, both the aforesaid problems in the retrieval speed and the storage space in the art can be substantially resolved. In particular, to the mainstream slim mobile communication devices that can only provide a limited storage space, the voice file retrieval method provided by the present invention is extremely suitable.

While the present invention has been particularly shown and described with reference to a preferred embodiment, it will be understood by those skilled in the art that various changes in form and detail may be without departing from the spirit and scope of the present invention.

I claim:

1. A voice file retrieval method comprising the steps of:
- inputting a word;
- determining if voicing of the word is needed or not;
- when voicing of the word is needed, obtaining a storage home address of an Adaptive Multi-Rate (AMR) voice file without a heading message corresponding to the word from a voice field of the word;
- retrieving the voice file from the storage home address;
- reloading the heading message to the AMR voice file after the AMR voice file is retrieved;
- displaying the AMR voice file by an AMR displayer; and
- determining whether or not a reply of said AMR voice file is needed, after said AMR displayer plays said AMR voice file.

2. The voice file retrieval method according to claim 1, wherein the AMR displayer displays the AMR voice file one more time, when the replay of the AMR voice file is needed.

3. The voice file retrieval method according to claim 1, wherein the storage home address includes an index information and a position information, the AMR voice file being retrieved by referring to an index table for the index information and the position information.

4. An Adaptive Multi-Rate (AMR) voice file retrieval method, applied to an electronic dictionary of a mobile communication device, the electronic dictionary including a plurality of words and a plurality of AMR voice files respective to the words, the AMR voice files being individually formed with a common heading message removed, the method comprising the steps of:
- inputting a specific word of the words with a field information;
- determining if voicing of the specific word is needed or not;
- retrieving the specific word from the words for obtaining all of the field information of the specific word;
- when voicing of the specific word is needed, obtaining a storage home address of a specific AMR voice file of the AMR voice files corresponding to the specific word from a voice field of the field information of the specific word;
- retrieving the specific AMR voice file from the storage home address;
- reloading the common heading message to the AMR specific voice file after the specific AMR voice file is retrieved;

displaying the specific AMR voice file by an AMR displayer; and determining if or not a replay of said specific AMR voice file is needed, after said AMR displayer plays said specific AMR voice file.

5. The AMR voice file retrieval method according to claim 4, wherein the AMR displayer displays the specific AMR voice file one more time, when the specific AMR voice file needs to be replayed.

6. The AMR voice file retrieval method according to claim 4, wherein said storage home address includes an index information and a position information, said specific AMR voice file being retrieved by referring to an index table for the index information and the position information.

* * * * *